United States Patent
Atsumi et al.

[11] Patent Number: 6,161,878
[45] Date of Patent: Dec. 19, 2000

[54] EXTERNAL COVER PIPE FOR FLUID TRANSPORT PIPE

[75] Inventors: Kazuhiro Atsumi, Toyonaka; Kikuo Saito, Hyogo-ken; Yasushi Shimonaka, Takatsuki; Tamotsu Maenishi, Sanda, all of Japan

[73] Assignee: Waterworks Technology Development Organization Co., Ltd., Osaka, Japan

[21] Appl. No.: 09/140,588

[22] Filed: Aug. 26, 1998

[30] Foreign Application Priority Data

Sep. 1, 1997 [JP] Japan ................................. 9-235791

[51] Int. Cl.⁷ .................................................. F16L 39/00
[52] U.S. Cl. ........................ 285/133.21; 285/373; 138/99
[58] Field of Search ................... 138/97, 99; 285/328, 285/373, 197, 15, 133.21, 133.11, FOR 138; 137/317, 318, 319, 320

[56] References Cited

U.S. PATENT DOCUMENTS

| | | | |
|---|---|---|---|
| 863,887 | 8/1907 | Stuttle | 285/373 |
| 1,994,361 | 3/1935 | Johnson | 285/373 X |
| 3,003,793 | 10/1961 | Pitt | 285/373 X |
| 3,280,846 | 10/1966 | Anderson et al. | 138/99 |
| 4,299,413 | 11/1981 | Neher | 285/373 X |
| 4,652,023 | 3/1987 | Timmons | 138/99 X |
| 4,768,813 | 9/1988 | Timmons . | |
| 4,895,397 | 1/1990 | Miller . | |
| 5,190,324 | 3/1993 | Bird et al. | 285/328 |
| 5,853,030 | 12/1998 | Walding | 138/99 |

FOREIGN PATENT DOCUMENTS

| | | |
|---|---|---|
| 21 29199 | 10/1972 | France . |
| 2111153 | 6/1983 | United Kingdom . |

Primary Examiner—Lynne H. Browne
Assistant Examiner—Greg Binda
Attorney, Agent, or Firm—Fulbright & Jaworski, LLP

[57] ABSTRACT

An external cover pipe is adapted to be fixedly fitted over a fluid transport pipe made of synthetic resin via an elastic seal. The cover pipe includes a plurality of split pipe members divided in the peripheral direction of the pipe which cooperate to compress the elastic seal in association with a fastening operation of a fastener for fastening and joining together the split pipe members disposed adjacent each other in the peripheral direction. Each split pipe member includes, in an inner peripheral face thereof, a deformation limiting face for coming into contact with an outer peripheral face of the fluid transport pipe in association with the fastening operation of the fastener so as to limit radial deformation of the fluid transport pipe. This deformation limiting face is provided at a portion in the inner peripheral face of the split pipe member located at a position axially offset toward an extreme axial end of the external cover pipe away from a portion thereof where the elastic seal is attached.

8 Claims, 4 Drawing Sheets

EXTERNAL COVER PIPE FOR FLUID TRANSPORT PIPE

BACKGROUND OF THE INVENTION

1. Field of the Invention

The present invention relates to an external cover pipe adapted to be fitted over a fluid transport pipe made of synthetic resin via an elastic seal. More particularly, the invention relates to an external cover pipe including a plurality of split pipe members divided in the peripheral direction of the pipe which cooperate to compress the elastic seal in association with a fastening operation of fastener means for fastening and joining together the split pipe members disposed adjacent each other in the peripheral direction.

2. Description of the Related Art

The fluid transport pipe with which the external cover pipe of the above-noted type is used is made of synthetic resin, so that this fluid transport pipe provides an advantage of being able to absorb, through its elastic bending deformation, an external force such as a bending moment applied to the fluid transport pipe in a direction transverse to its axis due to an earthquake, differential settlement or the like. As a result, damage to a weak portion in the piping system due to an external force may be limited advantageously.

According to the convention, when the split pipe members of the external cover pipe fitted over the fluid transport pipe via the elastic seal are fastened together by the fastener means, an annular gap is formed between the inner peripheral face of the cover pipe formed of the split pipe members and the outer peripheral face of the fluid transport pipe at each extreme axial end on the outer side of the elastic seal.

For instance, as shown in FIG. 8, in case the external cover pipe 30 is constructed as a branch pipe joint whose one split pipe member 50 integrally forms a branch pipe 7, an opposed pair of elastic seals 20 are fitted and retained to the inner peripheral faces of the split pipe members 50 of the cover pipe 50 for preventing leak of fluid from the gap formed between the outer peripheral face of the fluid transport pipe 1 and the inner peripheral face of the external cover pipe 30 and also from the further gap formed between the adjoined portions of the split pipe members 50. Then, with a fastening operation of the fastener means, these elastic seals 20 are elastically compressed, but still form annular gaps W between the outer peripheral face of the fluid transport pipe 1 and the inner peripheral face of the external cover pipe. More particularly, the presence of the seals 20 forms one elongate annular space communicated with an open hole 8 defined in the peripheral wall of the fluid transport pipe 1 and a pair of short annular spaces opened to the outside at the extreme axial ends on the outer side of the respective seals 20. As a result, elastic bending deformation developed in the peripheral wall portion of the fluid transport pipe 1 located within the branch pipe joint may be absorbed within the extent of the gap W.

In this respect, the amount of elastic deformation of the portion of the fluid transport pipe 1 located within the branch pipe joint 7 is much smaller than that of the entire fluid transport pipe 1. However, because of the formation of the gap W, between the inner peripheral face of the branch pipe joint 7 and the outer peripheral face of the fluid transport pipe 1, for allowing elastic bending deformation of the fluid transport pipe 1, with the elastic bending deformation of the fluid transport pipe 1, the peripheral wall portion of the fluid transport pipe 1 contacting either the peripheral sealing portion of the elastic seal 20 or the inner peripheral face portion of the branch pipe joint 7 adjacent thereto elastically deforms in the radial direction into an oval cross sectional shape, while elastically deforming the elastic seal 20. Then, there inevitably occurs reduction in the tightness (crimping) between the elastic seal 20 and the outer peripheral face of the fluid transport pipe at the portions corresponding to the short-diameter portions of the oval shape, so that the fluid flowing through the open bore of the fluid transport pipe 1 tends to leak through these portions of reduced tightness.

SUMMARY OF THE INVENTION

The present invention has been made to overcome the above-described problem of the prior art.

To this end, according to the features of the present invention, in an external cover pipe to be fitted over a fluid transport pipe made of synthetic resin via an elastic seal, the external cover pipe includes a plurality of split pipe members divided in the peripheral direction of the pipe which cooperate to compress the elastic seal in association with a fastening operation of fastener means for fastening and joining together the split pipe members disposed adjacent each other in the peripheral direction, each said split pipe member includes, in an inner peripheral face thereof, a deformation limiting face for coming into contact with an outer peripheral face of the fluid transport pipe in association with the fastening operation of the fastener means so as to limit radial deformation of the fluid transport pipe, the deformation limiting face being provided at a portion in the inner peripheral face of the split pipe member located at a position axially offset toward an extreme axial end of the external cover pipe away from a portion thereof where the elastic seal is attached.

With the characterizing construction described above, when the split pipe members of the external cover pipe fitted over the fluid transport pipe via the elastic seal are joined and fastened together by the fastener means, the elastic seal is compressed in a sealed condition and at the same time the deformation limiting face provided at the inner peripheral face portion of each split pipe member at a position axially offset toward an extreme axial end of the external cover pipe away from a portion thereof where the elastic seal is attached comes into contact with the outer peripheral face of the fluid transport pipe thereby to limit the amount of radial direction of the pipe wall at this position. Consequently, when the fluid transport pipe made of synthetic resin is elastically deformed by some external force due to an earthquake, differential settlement or the like, the peripheral wall portion contacting the elastic seal will not or will hardly be deformed into the oval cross sectional shape.

In achieving the present invention, the inventors noted that the amount of elastic bending deformation of the portion of the fluid transport pipe located within the external cover pipe is so small as compared with that of the entire fluid transport pipe that elimination of the former deformation hardly affects the ability of the entire fluid transport pipe of absorbing an external force through elastic bending deformation thereof. Then, based on this finding, the present invention was made which proposes a simple and economical solution to the problem by providing the deformation limiting face at the portion of the inner peripheral face portion of each split pipe member at a position axially offset toward an extreme axial end of the external cover pipe away from the seal attaching portion. With this construction, the fluid transport pipe may effectively absorb an external force resulting from an earthquake, differential settlement or the like through elastic bending deformation of this transport pipe, yet, the problem of fluid leakage due to local reduction in the tightness of the elastic seal in the peripheral direction thereof may be restricted effectively.

Preferably, a further deformation limiting face for coming into contact with an outer peripheral face of the fluid transport pipe in association with the fastening operation of the fastener means so as to limit radial deformation of the fluid transport pipe is provided at a further portion of the inner peripheral face of each split pipe member located at a position offset from the seal attaching portion toward an axial center of the member.

With the above-described construction, in the inner peripheral face of each split pipe member, in addition to the deformation limiting face provided at the portion offset from the seal attaching portion toward the extreme axial end, the further deformation limiting face is provided on the opposite side at the portion offset from the seal attaching portion toward the axial center. Then, with provision of this further deformation limiting face, the above-described problem of elastic bending deformation of the fluid transport pipe into the oval cross sectional shape may be restricted further effectively.

Preferably, the deformation limiting face of each split pipe member includes a bite-in portion in the form of projection to bite into the outer peripheral face of the fluid transport pipe.

With the above construction, due to the binding effect on the fluid transport pipe resulting from compression of the elastic seal as well as to the bite-in effect of the bite-in portion into the outer peripheral face of the fluid transport pipe, when an external force in the axial or peripheral direction is applied to the fluid transport pipe and the external cover pipe due to an earthquake, differential settlement or the like, an axial or peripheral displacement between the fluid transport pipe and the external cover pipe may be effectively restricted, so that these transport pipe and cover pipe may be maintained under the initially assembled posture relative to each other.

Moreover, since the bite-in portion is provided in the form of projection in the deformation limiting face, this construction provides a merit of simplicity as not requiring increase in the number of components. Furthermore, since the bite-in portion is provided outside the seal attaching area, the bite-in portion does not damage the seal.

More preferably, the bite-in portion includes a plurality of groups of projections, projections belonging in a pair of groups thereof located at opposed peripheral ends of the split pipe member extending substantially parallel with the peripheral direction.

With the above construction, when the split pipe member is moved toward the axis of the fluid transport pipe (i.e. moved in the radial inward direction) in association with the fastening operation of the fastener means, the projections located at the opposed peripheral ends of the split pipe member are moved along the peripheral direction while biting into the outer peripheral face of the fluid transport pipe. In this, as each of these projections extends along the peripheral direction, the projection provides smaller resistance against this movement than a projection extending with an inclination relative to both the axial direction and peripheral direction of the pipe. As a result, the force required for the fastening operation of the fastener means may be reduced. Moreover, once these projections located at the opposed peripheral ends of the split pipe members have bitten into the outer peripheral face of the fluid transport pipe, the projections, by their side faces extending along the peripheral direction, can provide very strong resistance against an axial displacement of the external cover pipe relative to the fluid transport pipe.

Preferably, the groups of projections include a further group of projections which are disposed at an peripheral intermediate portion of the split pipe member, each said projection of the further group extending with an inclination relative to both the axial and peripheral directions of the pipe.

When the split pipe members are moved in the axial direction relative to the fluid transport pipe in association with the fastening operation of the fastener means, the amount of movement of those projections located at the peripheral intermediate portion of the split pipe member is smaller than that of the projections located at the peripheral end of the split pipe member. For this reason, the former group of projections need not extend along the peripheral direction. Rather, the projections of this group are formed with the inclination described above. With this, the relative displacement in the axial direction between the fluid transport pipe and the external cover pipe may be effectively restricted by the side faces of the projections extending along the peripheral direction and also by the inclined side faces of the further projections located at the intermediate portion. Further, relative displacement in the peripheral direction between the same may also be effectively restricted by the inclined side faces of the latter projections located at the intermediate portion.

Still preferably, the group of the inclined projections include two kinds of sub-groups of projections whose inclinations are in opposition to each other.

With the above when an external force (tensile force or compressive force) is applied to the fluid transport pipe due to an earthquake, differential settlement or the like so as to apply a rotational force to each bite-in portion having the two kinds of projections of different inclinations, so that component forces are developed at these projections. In such case, however, since the component forces of the projections may be cancelled out as these forces are effective in opposition to each other, Consequently, when an external force in the axial direction is applied to the fluid transport pipe, relative displacement in the axial and peripheral directions between the fluid transport pipe and the external cover pipe may be effectively restricted.

According to one aspect of the present invention, the external cover pipe comprises a branch pipe joint whose at least one split pipe member forms a branch pipe.

In case the external cover pipe is constructed as a branch joint pipe as described above, the elastic bending deformation of the fluid transport pipe is apt to occur, not only when the external force resulting from an earthquake, differential settlement or the like is directly applied to the pipe, but also when the external force is applied to the branch pipe. Further, such external force applied to the branch pipe system will tend to invite relative rotational displacement between the fluid transport pipe and the external cover pipe.

For this reason, the above-described construction according to the invention will be very useful in case the cover pipe is provided as a branch pipe joint.

According to a further aspect of the present invention, the external cover pipe comprises a repairing pipe for use in repairing a damaged portion of the fluid transport pipe.

If the external cover pipe is embodied as a repairing pipe as above, when the fluid transport pipe is a water pipe and a water leakage has occurred due to a damage such as a fissure or a crack hole formed in the pipe wall. The damaged portion may be repaired for restoring the fluid transport pipe by attaching the external cover pipe to the fluid transport pipe.

Further and other features and merits of the invention will become apparent from the following detailed description of the preferred embodiments with reference to the accompanying drawings.

DETAILED DESCRIPTION OF THE PREFERRED EMBODIMENTS

Preferred embodiments of the invention will now be described in details with reference to the accompanying drawings.

[first embodiment]

Figure 1:
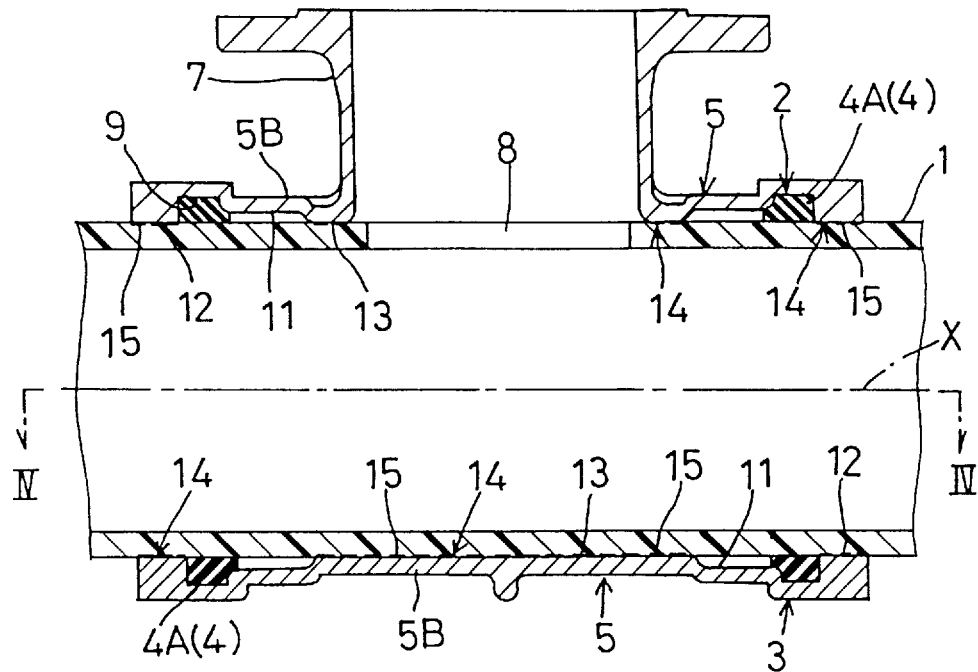
FIG. 1 is a vertical section showing an external cover pipe for a fluid transport pipe relating to a first embodiment of the present invention.
Figure 2:
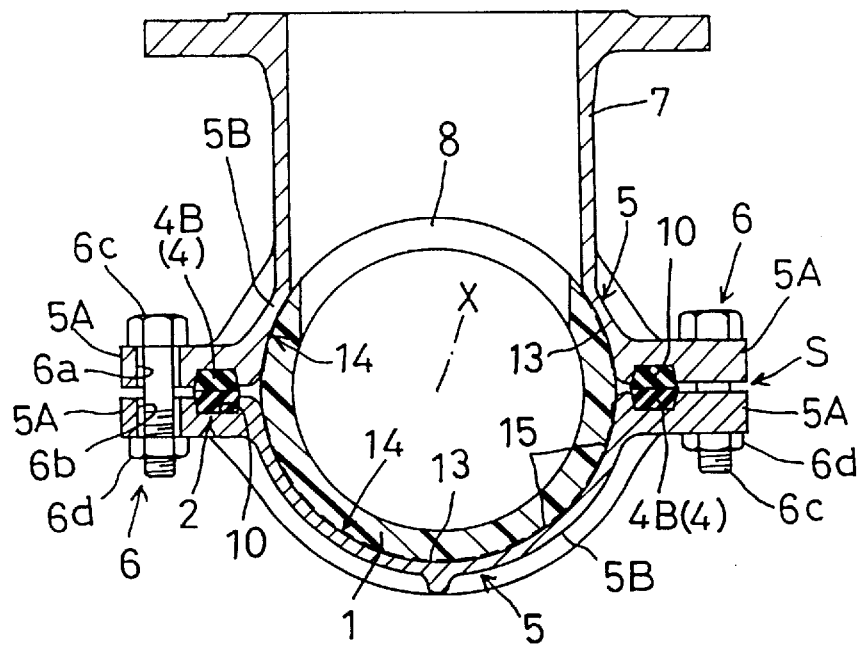
FIG. 2 is a section showing the external cover pipe relating to the first embodiment.
Figure 3:
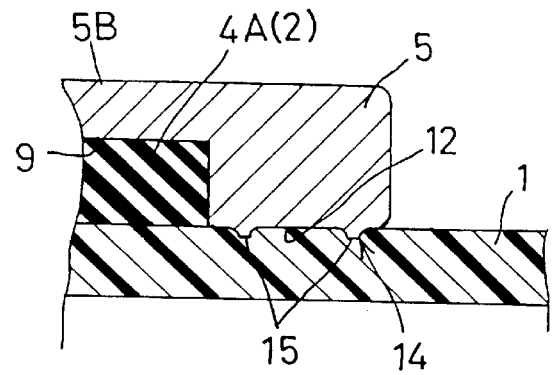
FIG. 3 is an enlarged section showing a principal portion of FIG. 1.

As shown in FIGS. 1–3, a T-shaped branch pipe joint 3 made of cast iron, as an example of an external cover pipe relating to the invention, is fitted on an intermediate portion of a straight water pipe 1 made of polyethylene, as an example of a fluid transport pipe made of synthetic resin, via an elastic seal 2 made of synthetic rubber in a sealed (water-tight) manner. The elastic seal 2 consists of two peripherally split seal members 4. Similarly, the branch pipe joint 3 consists of two peripherally split pipe members 5 ("split joint pipe members 5" hereinafter in this embodiment). Each split seal member 4 is fitted to the inner peripheral face of each split joint pipe member 5 associated therewith. Then, the two split joint pipe members 5 are fitted over the peripheral wall of the water pipe 1. The split joint pipe members 5 are constructed such that the elastic seal 2 may be compressed in a sealed state against the outer peripheral face of each end portion of the water pipe 1 in association with a fastening operation of a fastener means 6 adapted for fastening and joining together with the two split joint pipe members 5 peripherally adjacent each other.

One of the split joint pipe members 5 integrally forms a branch pipe portion 7 for communication and connection with a branch pipe system (not shown) including a branch pipe or a valve box having a valve or the like. In the peripheral wall of the water pipe 1 at a portion thereof opposing to the branch pipe portion 7, there is defined a through hole 8 for communicating between the branch pipe portion 7 and the water pipe 1.

Figure 6:
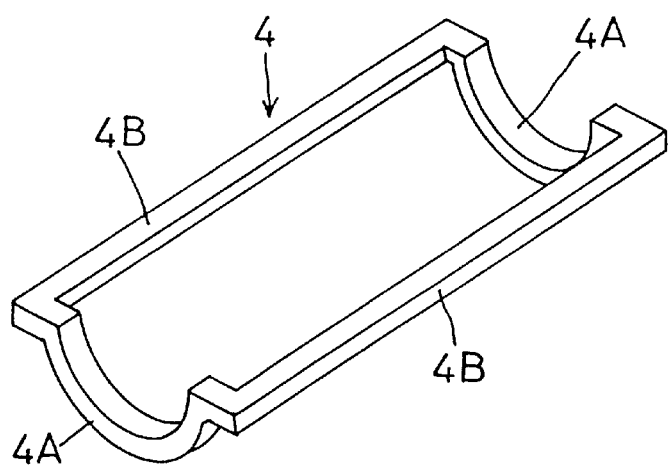
FIG. 6 is a perspective view showing a split seal member, FIG. 7 partially cutaway vertical section showing an external cover pip a fluid transport pipe relating to a second embodiment of the invention.

As shown in FIG. 6, each split seal member 4 integrally includes a pair of peripheral sealing portions 4A disposed at opposed ends in the direction of pipe axis X and a pair of axially extending sealing portions 4B interconnecting the corresponding opposed ends of the peripheral sealing portions 4A and extending parallel or substantially parallel with the axial direction X.

Figure 4:
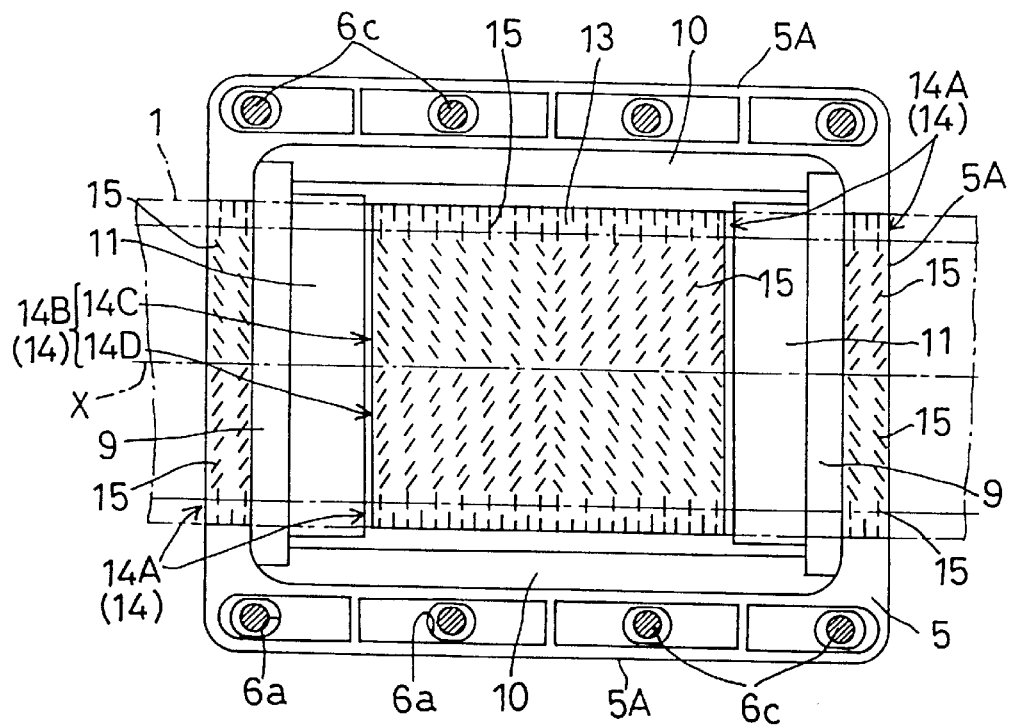
FIG. 4 is a section taken along a line IV—IV in FIG. 1.

As shown in FIG. 2, the split joint pipe member 5 integrally forms, at each peripheral end thereof, a connecting flange portion 5A projecting outward in the direction of radius of the pipe along a line segment extending through the pipe axis X. This connecting flange portion 5A is to be fastened by the fastener means 6. Further, as shown in FIGS. 1 and 4, a semi-cylindrical portion 5B of the split joint pipe member 5 defines, at respective opposed ends in the axial direction X in the inner peripheral face thereof, an arcuate engaging groove 9 for gaplessly and removably retaining the peripheral sealing portion 4A of the split seal member 4. Further, this inner peripheral face of the semi-cylindrical portion 5B of the split joint pipe member 5 further defines, at each peripheral end thereof, a straight engaging groove 10 for gaplessly and removably retaining the axial sealing portion 4B of the split seal member 4.

That is, the arcuate engaging grooves 9 and the straight engaging grooves 10 are provided at the area where the split seal members 4 are to be attached.

Further, in the inner peripheral face of the semi-cylindrical portion 5B of the split joint pipe member 5 and at portions thereof on the more central side in the axial direction than the arcuate engaging grooves 9 where the split seal member 4 is attached, concave portion 11 are formed for allowing elastic expansion deformation of the peripheral sealing portions 4A toward the pipe axis X in association with the fastening operation of the fastener means 6.

As shown in FIG. 1, in the inner peripheral face of the semi-cylindrical portion 5B of the split joint pipe member 5 and at portions thereof more offset toward the extreme ends in the axial direction X than the arcuate groove portions 9, there are formed first deformation limiting faces 12 for coming into contact with the outer peripheral face of the water pipe 1 so as to limit radial deformation of the peripheral wall of this water pipe 1 in association with the fastening operation of the fastener means 6.

Moreover, in the inner peripheral face of the semi-cylindrical portion 5B of the split joint pipe member 5 and at portions thereof more offset toward the center in the axial direction X than the arcuate engaging grooves 9 and away from the concave portions 11, there are formed second deformation limiting faces 13 for coming into contact with the outer peripheral face of the water pipe 1 so as to limit radial deformation of the peripheral wall of this water pipe 1 in association with the fastening operation of the fastener means 6.

Figure 5:
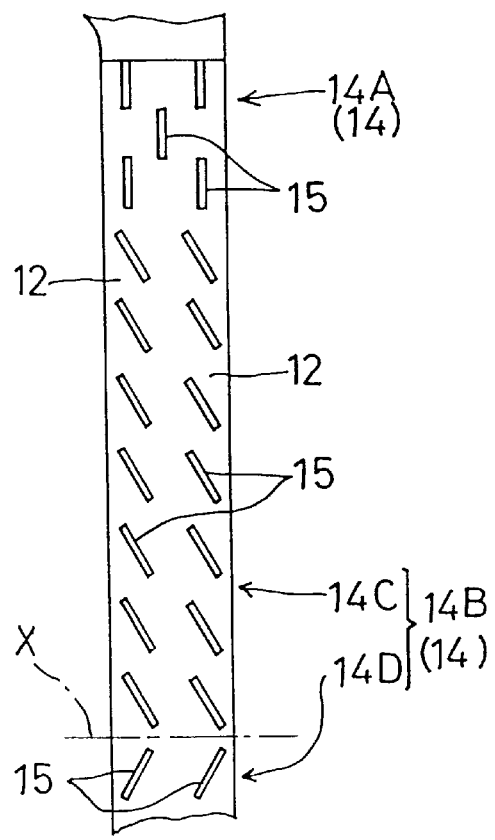
FIG. 5 is an enlarged partial view showing a deformation limiting face.

Further, as shown in FIGS. 4 and 5, the first and second deformation limiting faces 12, 13 of the split joint pipe member 5 described above integrally form bite-in portions 14 provided in the form of a number of projections and adapted for biting into the outer peripheral face of the water pipe 1.

The number of the bite-in portions 14, i.e. the projections (or ridges), include a first group of projections 14A provided at the respective opposed peripheral ends of the split joint pipe member 5. Each projection 15 belonging in this first projection group 14A extends along the peripheral direction and these projections 15 are arranged in a staggered pattern relative to the axial direction X.

The bite-in portions or projections 14 further include a second projection group 14B provided at the peripherally intermediate portion in the inner peripheral face of the split joint pipe member 5. The projections belonging in this group 14B are arranged in such a manner as to extend with an inclination relative to both the axial direction X and the peripheral direction.

The second projection group 14B described above consists of two pairs of sub groups of projections, namely, third projection groups 14C and fourth projection groups 14D. The projections belonging in the former group 14C extend with a right-hand inclination whereas those in the latter group 14D extend with a left-hand inclination. More particularly, each projection 15 of the third projection group 14C is provided as a ridge which extends with an approximate 60-degree inclination relative to the pipe axis X, whereas each projection 15 of the fourth projection group 14D is provided as a ridge which extends with an approximate 60-degree inclination in the opposite direction relative to the pipe axis X, respectively.

Each of all of the projections 15 described above has a height of about 1 mm, a length of about 10 mm, and a width of about 1 mm or less.

As shown in FIG. 4, in the inner peripheral face of the semi-cylindrical portion 5B of the split joint pipe member 5, the third projection groups 14C and the fourth projection groups 14D together constituting the second projection group 14B are distributed across the peripheral center line; and the first projection groups 14A are disposed at the opposed peripheral ends of the second projection group 14B.

Further, the third projection groups 14C and the fourth projection groups 14D respectively have a peripheral extension of 60 degrees to the right-hand side (clockwise) and to the left-hand side (counter-clockwise) about the pipe axis X from the peripheral center of the inner peripheral face as seen from the direction of pipe axis X (the direction of FIG. 2) when the split joint pipe member 5 is fitted over the outer peripheral face of the water pipe 1.

When the bite-in portions 14 (projections or ridges) have bitten into the outer peripheral face of the peripheral wall of the water pipe 1 in association with the fastening operation of the fastener means 6, there remains a gap S between the respective connecting flanges 5A opposed to each other in the peripheral direction.

This gap S provides an extra margin for allowing additional fastening when it is necessary or appropriate. As a result, the fastening operation may be effected to obtain the bite-in condition of the projections into the outer peripheral face of the water pipe 1 even if the projections constituting the bite-in portions 14 have a small height.

Moreover, in the course of the above, the space S formed between the connecting flange portions 5A allows radial elastic expanding deformation of each axial sealing portion 4B of the elastic seal 2 therethrough. Hence, the presence of the concave portions 11 and the spaces S help to restrict excessive build-up of the surface pressure between the elastic seal 2 and the outer peripheral face of the water pipe 1, thereby to minimize internal stress in the water pipe 1 made of synthetic resin.

The fastener means 6 includes bolt-inserting holes 6a defined in the connecting flange portions 5A of the one split joint pipe member 5, bolt-inserting holes 6b defined in the connecting flange portions 5A of the other split joint pipe member 5, bolts 6c inserted into the bolt-inserting holes 6a, 6b and nuts 6d to be thread-fitted with the bolts 6c.

Incidentally, if case the through hole 8 of the water pipe 1 is to be formed after fitting the branch pipe joint 3 over the water pipe 1 (e.g. if the through hole 8 is formed without suspending the water supply), a known boring machine will be attached to the branch pipe portion 7, then, the boring head of the boring machine will be introduced through the branch pipe portion 7 into the branch pipe joint 3 to form the through hole 8.

On the other hand, if the water supply in the water pipe 1 is suspended, the through hole 8 may be formed before fitting the branch pipe joint 3 on the water pipe 1.

Further, when the split joint pipe members 5 of the branch pipe joint 3 have been fastened via the elastic seal 3 on the water pipe 1, the bite-in effect of the bite-in portions 14 into the outer peripheral face of the peripheral wall of the water pipe 1 will prevent relative rotational displacement between the water pipe 1 and the branch pipe joint 3 to maintain the opposing position relationship between the through hole 8 and the branch pipe joint 3, even when the water pipe 1 and/or the branch pipe system is exposed to an external force resulting from an earthquake, differential settlement or the like.

[second embodiment]

Figure 7:
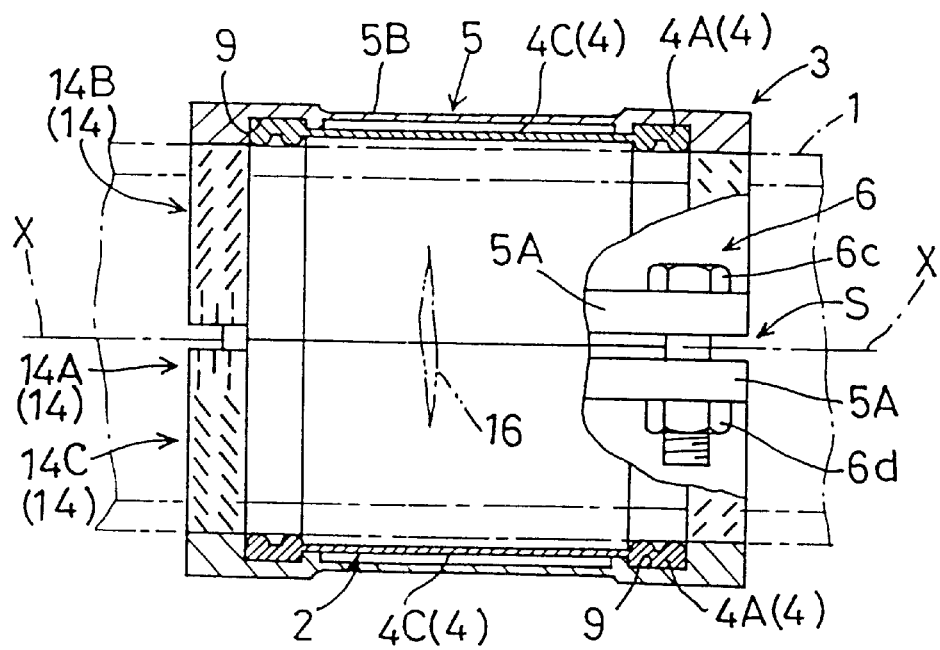
Figure 8:
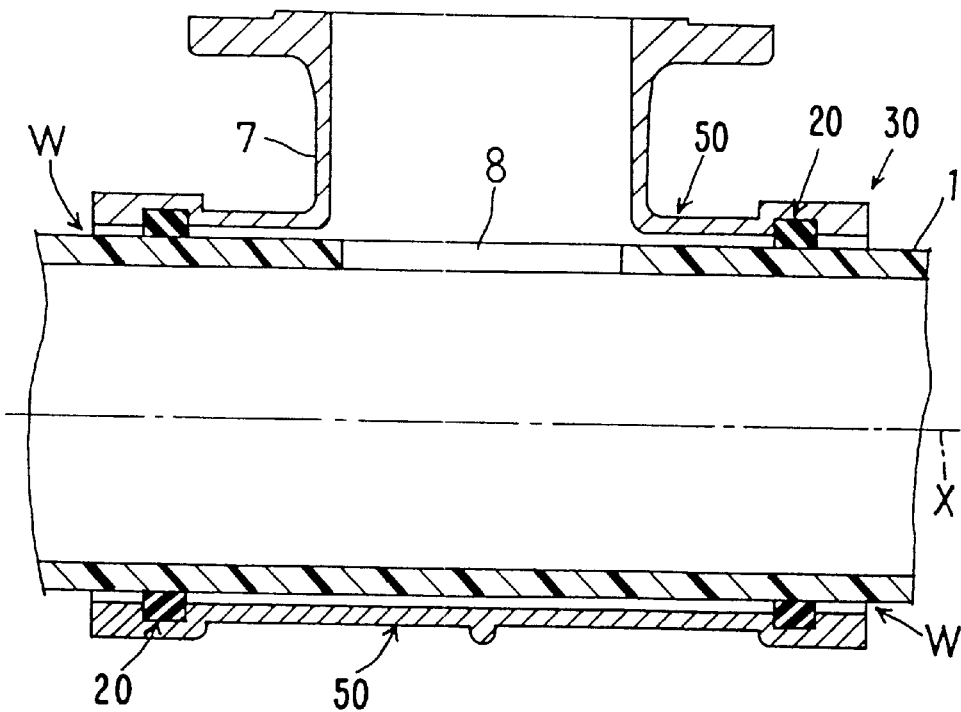
FIG. 8 is vertical section showing a conventional external cover pipe for a fluid transport pipe.

As shown in FIG. 7, in the second embodiment of the present invention, a repairing pipe 3, as another example of the external cover pipe relating to the invention, is fitted over an intermediate portion of the water pipe 1 in a sealed (water-tight) condition via an elastic seal 2 having a cylindrical shape and made of synthetic rubber. Like the first embodiment described hereinbefore, this elastic seal 2 consists of two peripherally split seal members 4. Similarly, the repairing pipe 3 consists of two peripherally split pipe members 5 ("split repairing pipe members 5" hereinafter in this embodiment). Each split seal member 4 is fitted to the inner peripheral face of each split repairing pipe member 5 associated therewith. Then, the two split repairing pipe members 5 are fitted over the peripheral wall of the water pipe 1. The split repairing pipe members 5 are constructed such that the elastic seal 2 may be compressed in a sealed state against the outer peripheral face of each end portion of the water pipe 1 in association with a fastening operation of a fastener means 6 adapted for fastening and joining together with the two split repairing pipe members 5 peripherally adjacent each other.

The repairing pipe 3 is for use in restoring the water pipe 1 by covering a damaged portion in the peripheral wall of the water pipe 1 such as a water-leaking hole 16, e.g. a fissure or a crack hole formed therein.

Each split seal member 4 includes a pair of peripheral sealing portions 4A disposed at the opposed ends in the axial direction X, a pair of axial sealing portions 4B interconnecting the ends of the opposed peripheral sealing portions 4A and extending parallel or substantially parallel with the axis X, and a thin-film-like sealing portion 4C covering the area surrounded and delimited by the peripheral sealing portions 4A and the axial sealing portions 4B.

In the inner peripheral face of the semi-cylindrical portion 5B of the split repairing pipe member 5 and at portions thereof more offset toward the extreme ends in the axial direction X than the area where the split seal member 4 is attached, there are formed deformation limiting faces 12 for coming into contact with the outer peripheral face of the water pipe 1 so as to limit radial deformation of the peripheral wall of this water pipe 1 in association with the fastening operation of the fastener means 6.

Further, the deformation limiting faces 12 of the split repairing pipe member 5 described above integrally form bite-in portions 14 provided in the form of a number of projections and adapted for biting into the outer peripheral face of the water pipe 1.

These bite-in portions 14 are identical to the bite-in portions 14 formed in the first deformation limiting faces in the first embodiment. Therefore, these portions 14 are denoted with the identical reference numeral and will not be described here in repetition.

Further, the rest of the construction of this second embodiment are the same as the first embodiment. Thus, like components are denoted with like reference marks or numerals and will not be described here.

[other embodiments]

In the foregoing embodiments, the fastener means 6 employs the bolts 6c and nuts 6d. However, the specific construction of this fastener means 6 is not particularly limited in the present invention, this fastener means may employ instead an eccentric cam mechanism for instance.

In the foregoing embodiments, the external cover pipe 3 consists of two peripherally split pipe members 5. Instead, the cover pipe 3 may consist of more than three peripherally split pipe members.

In the foregoing embodiments, the external cover pipe 3 is embodied as a branch pipe joint and a repairing pipe, respectively. Alternatively, the external cover pipe 3 may be embodied also as a joint pipe for interconnecting two fluid transport pipes with each other.

In the foregoing embodiments, the fluid transport pipe 1 comprises a water pipe. However, the invention may be applied also in a petroleum pipe line if the fluid transport pipe 1 is made of synthetic resin having resistance against petroleum.

In the first embodiment, the projections 15 constituting the third projection group 14C are provided as ridges having an approximately 60-degree inclination relative to the pipe axis X, whereas the projections 15 constituting the fourth projection group 14D are provided as ridges having an approximately 60-degree inclination in the opposite direction relative to the pipe axis X. In this respect, as long the directions of the inclinations of these projections 15 of the third projection group 14C and those of the fourth projection group 14D are in opposition to each other, the specific value of these inclinations may vary, depending on the particular case.

In the first embodiment, the third projection groups 14C and the fourth projection groups 14D together constituting the second projection group 14B are distributed across the peripheral center line. Instead, the second projection group 14B may be modified such that a plurality of third projection groups 14C and a plurality of fourth projection groups 14D are alternately arranged in the peripheral direction.

The present invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. An external cover pipe adapted to be fixedly fitted over a fluid transport pipe made of synthetic resin, comprising:
    a pipe member to be fitted over the fluid transport pipe, said pipe member including in a peripheral direction thereof a plurality of split pipe members;
    an elastic seal interposed between the split pipe members and the fluid transport pipe; and
    fastener means for fastening together the split pipe members adjacent each other in the peripheral direction, said elastic seal being compressed into a sealing condition in association with a fastening operation of said fastener means;
    wherein each said split pipe member includes, in an inner peripheral face thereof, a deformation limiting face for coming into contact with an outer peripheral face of the fluid transport pipe in association with the fastening operation of the fastener means so as to limit radial deformation of the fluid transport pipe, said deformation limiting face coming into face-to-face contact with the outer peripheral face of the fluid transport pipe; and
    wherein said deformation limiting face includes a plurality of projections capable of biting into the outer peripheral face of the fluid transport pipe in association with the fastening operation of the fastener means, some of said projections being formed with inclination relative to the peripheral direction of the fluid transport pipe.

2. The external cover pipe according to claim 1, wherein said plurality of projections includes two groups of projections wherein one group of projections projects in the opposite direction to the other group of projections with inclination of one group of projections being in opposite direction to the inclination of the other group of projections.

3. The external coverpipe according to claim 1, wherein each projection in said plurality of projections has a cross section with a slenderness ratio of 10 or more.

4. The external cover pipe according to claim 1, wherein said elastic seal includes a plurality of peripherally split seal members, each said split pipe member being capable of retaining each said split seal member.

5. The external cover pipe according to claim 4, wherein each said split seal member integrally includes a pair of peripheral sealing portions disposed at opposed axial ends of each said split pipe member and a pair of axial sealing portions interconnecting ends of the opposed peripheral sealing portions and extending substantially parallel with the pipe axis.

6. The external cover pipe according to claim 1, wherein each said split pipe member integrally forms, at each peripheral end thereof, a connecting flange portion projecting radially outward along a line segment extending through the pipe axis, the peripherally opposed connecting flange portions of the split pipe members being fastened by the fastener means; and a gap is formed between the peripherally opposed connecting flange portions when the projection has bitten into the outer periphery of the fluid transport pipe in association with the fastening operation of the fastener means.

7. The external cover pipe according to claim 1, wherein at least one of said split pipe members forms a branch pipe portion.

8. The external cover pipe according to claim 1, wherein at least one of said split pipe members forms a repairing pipe for use in repairing a damaged portion of the fluid transport pipe; and
    each said split seal member integrally includes a pair of peripheral sealing portions disposed at opposed axial ends of each said split pipe member, a pair of axial sealing portions interconnecting ends of the opposed peripheral sealing portions and extending substantially parallel with the pipe axis, and a thin-film-like sealing portion covering an area surrounded and delimited by said peripheral sealing portions and said axial sealing portions.

* * * * *